(12) United States Patent
Tanaka et al.

(10) Patent No.: US 12,195,945 B2
(45) Date of Patent: Jan. 14, 2025

(54) MACHINE BODY AND WORKING MACHINE

(71) Applicant: Caterpillar SARL, Geneva (CH)

(72) Inventors: Kenichi Tanaka, Akashi (JP);
Motoyuki Suzuki, Akashi (JP)

(73) Assignee: Caterpillar SARL, Geneva (CH)

( * ) Notice: Subject to any disclaimer, the term of this patent is extended or adjusted under 35 U.S.C. 154(b) by 185 days.

(21) Appl. No.: 17/909,624

(22) PCT Filed: Feb. 26, 2021

(86) PCT No.: PCT/EP2021/025078
§ 371 (c)(1),
(2) Date: Sep. 6, 2022

(87) PCT Pub. No.: WO2021/175490
PCT Pub. Date: Sep. 10, 2021

(65) Prior Publication Data
US 2023/0117708 A1    Apr. 20, 2023

(30) Foreign Application Priority Data

Mar. 6, 2020 (JP) .................................. 2020-039040

(51) Int. Cl.
*E02F 9/08* (2006.01)
*B60K 11/02* (2006.01)
(Continued)

(52) U.S. Cl.
CPC ............ *E02F 9/0866* (2013.01); *B60K 11/02* (2013.01); *B60K 11/08* (2013.01); *E02F 9/0883* (2013.01);
(Continued)

(58) Field of Classification Search
CPC combination set(s) only.
See application file for complete search history.

(56) References Cited

U.S. PATENT DOCUMENTS

| | | |
|---|---|---|
| 9,719,233 B1* | 8/2017 | Abe ...................... E02F 9/2275 |
| 2014/0124284 A1* | 5/2014 | Sekiya ................... B60K 13/04 |
| | | 180/309 |

(Continued)

FOREIGN PATENT DOCUMENTS

| | | |
|---|---|---|
| DE | 19948148 A1 | 6/2001 |
| DE | 102011009620 A1 | 8/2012 |

(Continued)

OTHER PUBLICATIONS

Japanese office action for Japanese Patent Appln. No. 2020-039040, mailed Oct. 11, 2023 (2 pgs).

(Continued)

*Primary Examiner* — Binh Q Tran

(57) ABSTRACT

A machine body comprises a sieving frame having a bottom plate. The machine body comprises an engine. The machine body comprises an exhaust gas cleaning apparatus that executes reduction treatment on a predetermined oxide in an exhaust gas of the engine by injecting a liquid reducing agent. The machine body comprises a reducing agent tank that stores a liquid reducing agent. The machine body comprises a reducing agent pump that feeds the liquid reducing agent stored in the reducing agent tank to the exhaust gas cleaning apparatus. The machine body comprises a cooling fan. The machine body is disposed on the bottom plate of the slewing frame and comprises an opening section that takes in outside air that cools the reducing agent pump by driving the cooling fan. The machine body comprises a duct section that leads the outside air taken from the opening section to the cooling fan.

4 Claims, 4 Drawing Sheets

(51) Int. Cl.
*B60K 11/08* (2006.01)
*E02F 3/32* (2006.01)
*F01N 3/20* (2006.01)
*F01N 3/22* (2006.01)
*F01N 13/00* (2010.01)

(52) U.S. Cl.
CPC .......... *E02F 9/0891* (2013.01); *F01N 3/2066* (2013.01); *E02F 3/32* (2013.01); *F01N 3/22* (2013.01); *F01N 13/001* (2013.01); *F01N 2260/022* (2013.01); *F01N 2610/1406* (2013.01); *F01N 2610/1433* (2013.01); *F01N 2610/1453* (2013.01); *F01N 2610/1466* (2013.01); *F01N 2900/1822* (2013.01)

(56) References Cited

U.S. PATENT DOCUMENTS

| | | | |
|---|---|---|---|
| 2016/0082830 A1* | 3/2016 | Okamura | B62D 33/0617 180/309 |
| 2016/0108793 A1 | 4/2016 | Bezaire et al. | |
| 2016/0282167 A1 | 9/2016 | Landwehr et al. | |
| 2017/0120747 A1 | 5/2017 | Ledoux et al. | |
| 2017/0218808 A1 | 8/2017 | Kurokawa et al. | |
| 2018/0274423 A1* | 9/2018 | Kubota | E02F 9/0883 |
| 2019/0120192 A1* | 4/2019 | Naganawa | F02F 7/007 |
| 2019/0226380 A1* | 7/2019 | Sandou | F01N 3/035 |
| 2023/0323629 A1* | 10/2023 | Horii | E02F 9/2264 |

FOREIGN PATENT DOCUMENTS

| | | |
|---|---|---|
| EP | 3173537 A1 | 5/2017 |
| JP | H09221789 A | 8/1997 |
| JP | 5501534 B1 | 5/2014 |
| JP | 5636512 B1 | 12/2014 |
| WO | 2014185552 A1 | 11/2014 |

OTHER PUBLICATIONS

International Search Report related to Application No. PCT/EP2021/025078; reported on May 31, 2021.

* cited by examiner

MACHINE BODY AND WORKING MACHINE

CROSS-REFERENCE TO RELATED APPLICATION

This Application is a 35 USC 6371 US National Stage filing of International Application No. PCT/EP2021/025078 filed on Feb. 26, 2021 which claims priority under the Paris Convention to Japanese Patent Application No. 2020-039040 filed on Mar. 6, 2020.

TECHNICAL FIELD

The present invention relates to a machine body having a reducing agent pump that feeds a liquid reducing agent stored in a reducing agent tank to an exhaust gas cleaning apparatus, and a working machine comprising the same.

BACKGROUND ART

Generally, a diesel engine is used as an engine of a working machine such as a hydraulic excavator. Since the exhaust gas emitted from the diesel engine contains a large amount of nitrogen oxide, there is installed an exhaust gas cleaning apparatus that reduces nitrogen oxide to nitrogen by injecting a liquid reducing agent such as urea water into the exhaust gas.

The reducing agent tank that stores the liquid reducing agent and an injector serving as an injection device of the exhaust gas cleaning apparatus are connected by a pipe, and the liquid reducing agent is pumped from the reducing agent tank to the injector of the exhaust gas cleaning apparatus through this pipe by a reducing agent pump.

In a case of a large-sized working machine and so on, a distance from the reducing agent tank to the exhaust gas cleaning apparatus may be long in terms of the layout. For example, there has been known a working machine in which a reducing agent tank is disposed on the right front end of the machine body and an exhaust gas cleaning apparatus is disposed on the left rear end of the machine body (see, for example, Patent Literatures 1 and 2). Therefore, by disposing the reducing agent pump midway between the reducing agent tank and the exhaust gas cleaning apparatus, an existing typical reducing agent pump can be used. In that case, it is desirable to cool the reducing agent pump in order to maintain the quality of the liquid reducing agent.

In this respect, for example, there has been known a working machine in which an opening section is formed in a bottom guard at the bottom of a slewing frame so that an air cleaner can be accessed from below the air cleaner, for purpose of maintenance such as replacement of a filter of the air cleaner. In this working machine, an opening section for access of the air cleaner is utilized to form a hole portion in a cover that covers detachably the opening section, and thus the outside air can be taken from this hole portion and led to the radiator (See, for example, Patent Literature 3).

PRIOR ART LITERATURES

Patent Literatures

[PATENT LITERATURE 1] Japanese Patent No. 5501534
[PATENT LITERATURE 2] Japanese Patent No. 5636512
[PATENT LITERATURE 3] Japanese Patent Application Laid-Open No. H9-221789

SUMMARY OF THE INVENTION

Problems to be Solved by the Invention

However, as described in Patent Literature 3, the reducing agent pump may not be sufficiently cooled by simply taking in the outside air using the access opening section. Therefore, it is desired to efficiently cool the reducing agent pump with the taken-in outside air.

The present invention has been made in view of these points, and an object of the present invention is to provide a machine body that enables a reducing agent pump to be efficiently cooled and a working machine comprising the same.

Means for Solving the Problem

An invention according to claim 1 is a machine body comprising a frame having a bottom plate; an engine; an exhaust gas cleaning apparatus that executes reduction treatment on a predetermined oxide in an exhaust gas of the engine by injecting a liquid reducing agent; a reducing agent tank that stores a liquid reducing agent; a reducing agent pump that feeds the liquid reducing agent stored in the reducing agent tank to the exhaust gas cleaning apparatus; a cooling fan; an opening section disposed on the bottom plate of the frame, and takes in an outside air that cools the reducing agent pump by driving the cooling fan; and a duct section that leads the outside air taken from the opening section to the cooling fan.

An invention according to claim 2 is the machine body according to claim 1, wherein the opening section is an access opening section that enables access to the reducing agent pump therethrough.

An invention according to claim 3 is the machine body according to claim 1 or 2, comprising a tank that stores a fluid, wherein a portion of a wall section of the duct section is formed by a side surface of the tank.

An invention according to claim 4 is a working machine including a machine body according to any one of claims 1 to 3; and a working equipment mounted on the machine body.

Favorable Effects of the Invention

According to the invention of claim 1, the reducing agent pump can be disposed in a flow channel of the cooling air from the opening section to the cooling fan, and thereby the reducing agent pump can be efficiently cooled.

According to the invention of claim 2, it is not necessary to form a separate opening section for taking in the outside air, and both improvement of accessibility to the reducing agent pump and improvement of cooling efficiency of the reducing agent pump can be kept compatible.

According to the invention of claim 3, separate members for forming the wall section of the duct section can be reduced by effectively using the side surfaces of the tank, and thereby the duct section can be formed inexpensively and easily.

According to the invention of claim 4, it is possible to provide a working machine capable of maintaining the quality of the liquid reducing agent for a long period of time by cooling the reducing agent pump and efficiently reducing the exhaust gas discharged from the engine with the liquid reducing agent by the exhaust gas cleaning apparatus.

DETAIL DESCRIPTION OF THE INVENTION

Hereinbelow, the present invention will be described in detail based on an embodiment illustrated in FIGS. 1 through 4.

Figure 4:
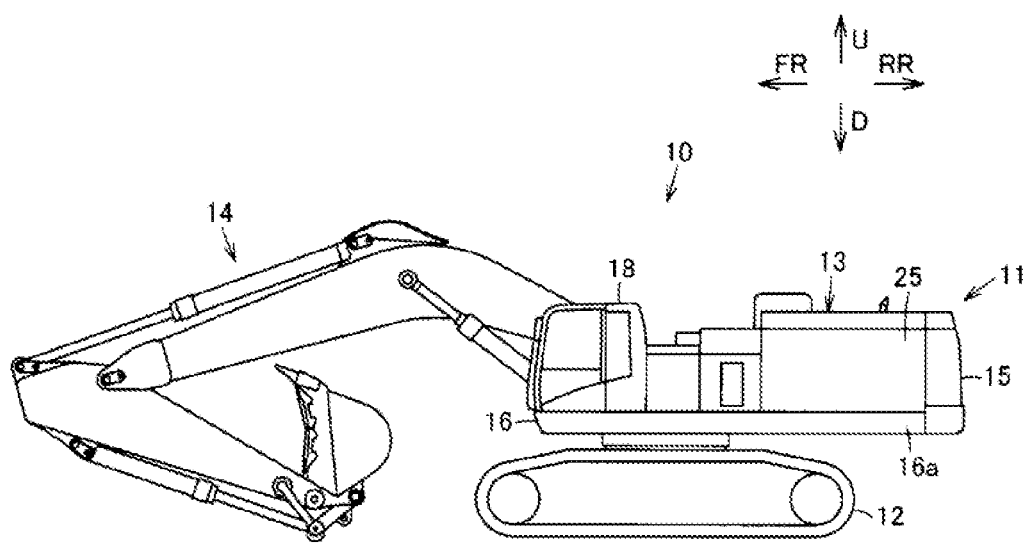
FIG. 4 is a side view illustrating a working machine comprising the machine body according to the present invention.

As illustrated in FIG. 4, a working machine 10 like a hydraulic excavator is configured to include a machine body 11 comprising a lower traveling body 12 and an upper slewing body 13 provided on the lower traveling body 12 so as to be able to slew, and a working equipment 14 for various works and a counter weight 15 mounted on the upper slewing body 13 of the machine body 11. In the illustrated example, the working equipment 14 is like a bucket, but is not limited to this, and may be the one equipped with a breaker or the like.

Figure 3:
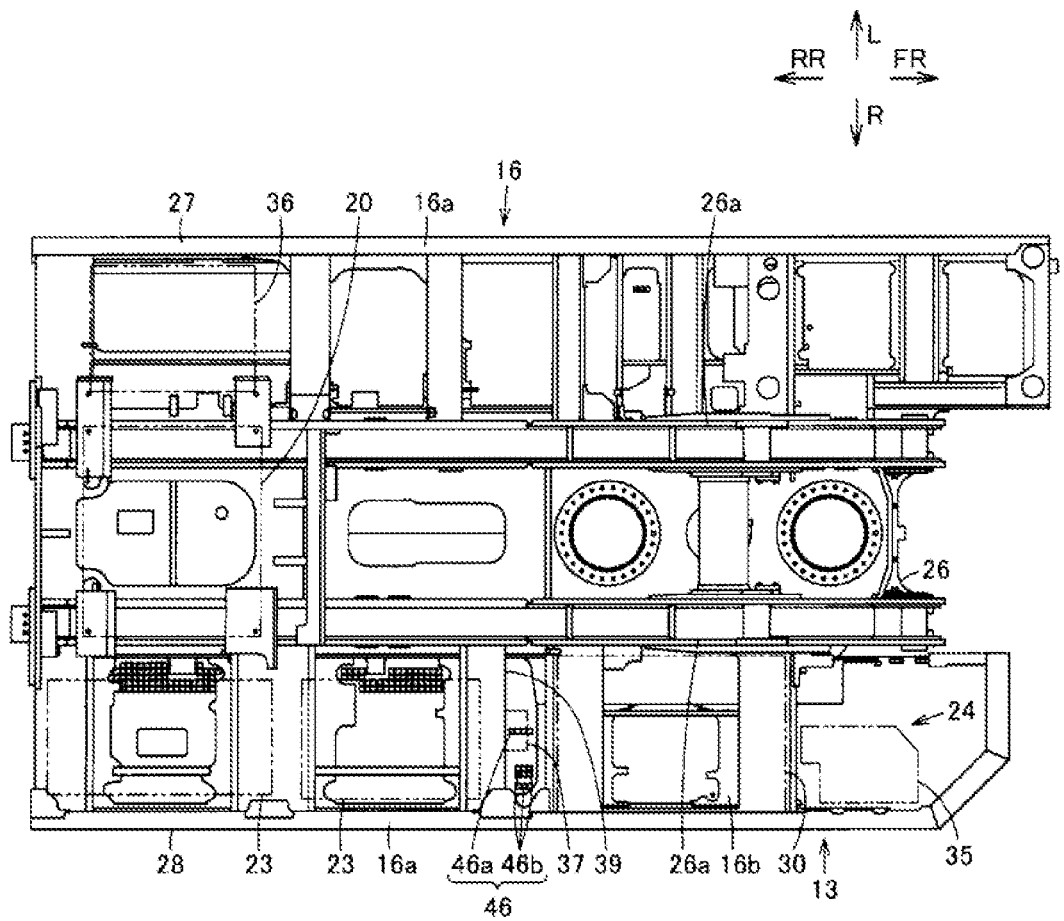
FIG. 3 is a plan view illustrating the machine body according to the present invention.

The upper slewing body 13 is configured such that a cab 18 provided with an operator's seat is mounted, on the slewing frame 16 serving as a frame, and as illustrated in FIG. 3, a control valve, an engine 20, a pump, a tank, a cooling package 23, an exhaust gas cleaning system (exhaust gas after-treatment system) 24 and so on are mounted thereon. The side portion of the slewing frame 16 is covered by an exterior cover 25 illustrated in FIG. 4. Hereinbelow, a front-rear direction, a left-right direction, and an up-down direction are based on the direction viewed from the operator seated in the operator's seat. In each figure, arrows FR, RR denote the front-rear direction, arrows L, R denote the left-right direction, and arrows U, D denote the up-down direction.

As illustrated in FIG. 3, the slewing frame 16 has a center frame 26 at the central portion in the left-right direction, which is a side-to-side direction. The center frame 26 is formed linearly in the front-rear direction. The center frame 26 comprises longitudinal plates 26a, 26a (which are a pair of side plates) spaced apart from each other in the left-right direction, and the base end portion of the working equipment 14 (FIG. 4) is axially supported between the front portions of these longitudinal plates 26a, 26a.

In addition, the slewing frame 16 has side-frames 27, 28 on the left and right sides of the center frame 26. The side-frames 27, 28 are constructed such that beam members extending in the left-right direction with respect to the center frame 26 are welded, frame bodies are welded at the tip end portions of the beam members, and support members are welded. The side-frames 27, 28 extend in the front-rear direction respectively.

The cab 18 (FIG. 4) is disposed on the left side-frame 27. The tank, the control valve, the engine 20, the pump, the cooling package 23, and the exhaust gas cleaning system 24 are arbitrarily disposed depending on the space of the slewing frame 16. In the present embodiment, the control valve and the engine 20 are disposed on the center frame 26; the pump and a part of the exhaust gas cleaning system 24 are disposed on the left side-frame 27; and at least a part of the tank, the cooling package 23, and the remaining other portions of the exhaust gas cleaning system 24 are disposed on the right side-frame 28.

For example, the control valve is supported by the center frame 26 behind the working equipment 14 (FIG. 4). The control valve controls the flow rate and direction of the hydraulic oil supplied to and discharged from actuators for traveling operation of the lower traveling body 12, for slewing operation of the upper slewing body 13, and for working operation of the working equipment 14 illustrated in FIG. 4.

Returning to FIG. 3, the engine 20 is supported by the center frame 26 behind the control valve. The engine 20 is located at the rear end portion of the slewing frame 16. The engine 20 is housed in a machinery room.

The pump, which is a hydraulic pump, is connected to the engine 20 and driven by the engine 20 to supply the hydraulic oil to the control valve etc. This pump is housed in a pump room adjacent to the left side of the machinery room. Inside the pump room, various hydraulic device and the like may be additionally housed.

The tanks include a fuel tank 30 that stores the fuel of the engine 20 being a fluid, and a hydraulic oil tank that stores the hydraulic oil being a fluid. In the present embodiment, the fuel tank 30 is disposed on the right side-frame 28. The hydraulic oil tank (not illustrated) can be disposed in any space, and is disposed on, for example, the center frame 26 or the left side-frame 27.

The cooling package 23 is an assembly of heat exchangers such as a radiator for cooling mainly the engine cooling water, an oil cooler for cooling the return oil, i.e., the hydraulic oil from actuators, and an intercooler for cooling a supercharger. The cooling package 23 is disposed in the flow channel of the cooling air sucked from a ventilation port formed on the side surface of the upper slewing body 13 (FIG. 4), by the cooling fan 33 (FIG. 1) driven by the engine 20 or the motor. In the present embodiment, the cooling package 23 is disposed at the rear portion of the right side-frame 28. Further, the cooling package 23 is housed in the machinery room adjacent to the engine 20. Furthermore, the cooling package 23 is disposed so as to face the side portion of the upper slewing body 13 (FIG. 4).

Figure 1:
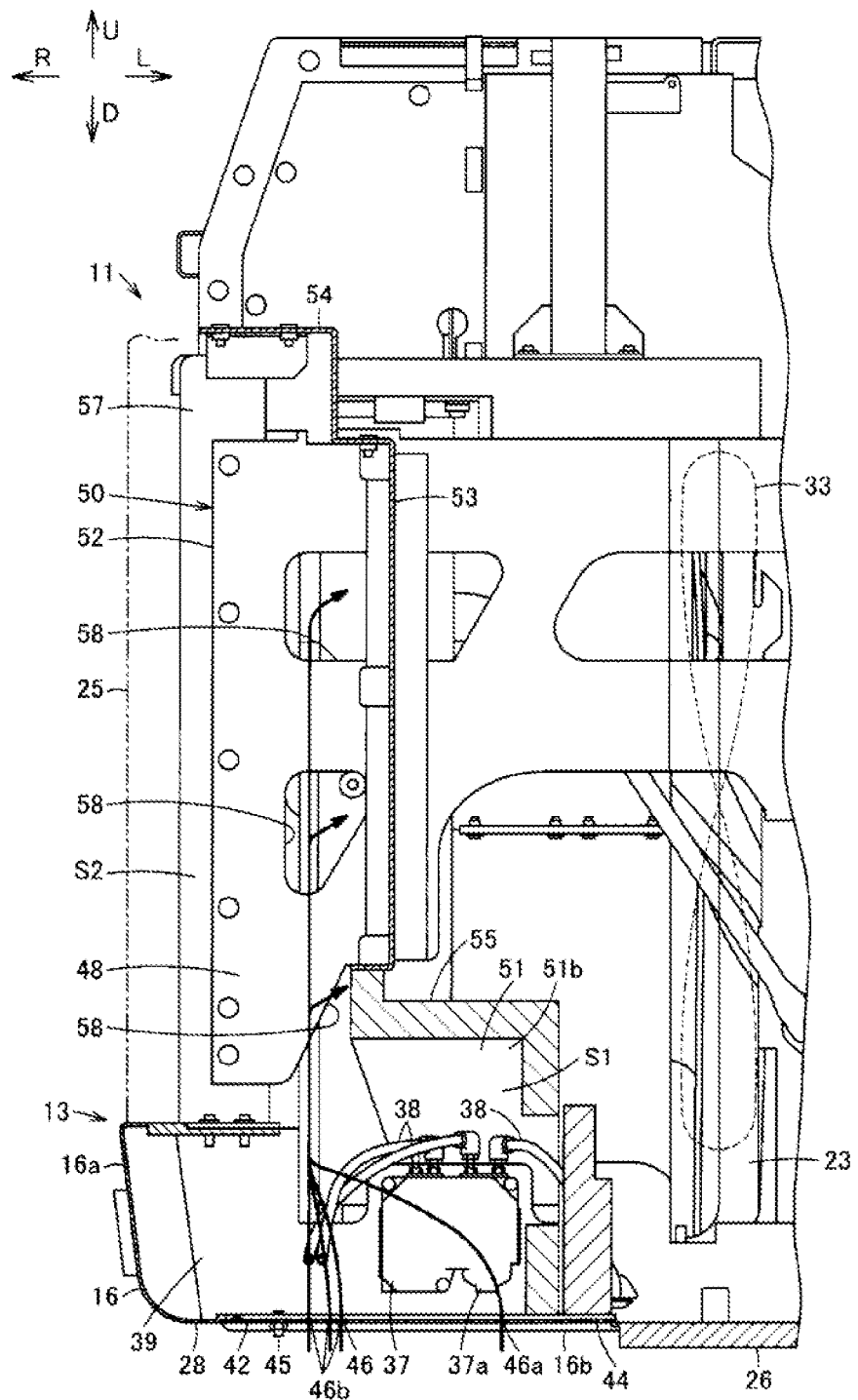
FIG. 1 is a cross-sectional view illustrating an embodiment of a machine body according to the present invention.

Then, the exhaust gas cleaning system 24 cleans the exhaust gas for an exhaust system of the engine 20 by using a liquid reducing agent. The exhaust gas cleaning system 24 comprises a reducing agent tank 35 that stores the liquid reducing agent, an exhaust gas cleaning apparatus 36 that treats the exhaust gas of the engine 20, and a reducing agent pump 37 that supplies the liquid reducing agent to the exhaust gas cleaning apparatus 36 by pumping and discharging the liquid reducing agent stored in the reducing agent tank 35, and these are connected by the pipes 38 (FIG. 1).

The reducing agent tank 35 stores the liquid reducing agent such as urea water used in the exhaust gas cleaning apparatus 36. In the present embodiment, the reducing agent tank 35 is disposed at the front-end portion of the right side-frame 28. The reducing agent tank 35 is housed inside a storage box for storing, for example, tools. In other words, in the illustrated example, the reducing agent tank 35 is disposed at the right front-end portion of the slewing frame 16. Further, the reducing agent tank 35 is disposed in front of the fuel tank 30. Furthermore, the reducing agent tank 35 is disposed near the lower portion of the slewing frame 16.

The exhaust gas cleaning apparatus 36 comprises a black smoke removing apparatus (diesel particulate filter) that removes black smoke in the exhaust gas, and a nitrogen oxide reduction apparatus (selective catalytic reduction) that executes reduction treatment on a nitrogen oxide that is predetermined oxide in the exhaust gas, and a diesel oxidation catalyst. The diesel oxidation catalyst is connected to an exhaust port of the engine 20 via a connecting pipe that becomes a starting point of the exhaust conduit; the black smoke removing apparatus is connected to the diesel oxidation catalyst via a connecting pipe; the nitrogen oxide reduction apparatus is connected to the black smoke removing apparatus; and the remaining portion of the exhaust conduit is connected to the nitrogen oxide reduction apparatus. An injector serving as an injection device that injects the liquid reducing agent, is disposed in a connecting pipe that connects the diesel oxidation catalyst and the black smoke removing apparatus. In the present embodiment, the injector is located at the rear portion of the exhaust gas cleaning apparatus 36. A supply pipe for supplying the liquid reducing agent from the reducing agent tank 35 by the reducing agent pump 37 is connected to the injector. Then, a liquid reducing agent such as urea water contained in the reducing agent tank 35 is pumped by the reducing agent pump 37 and supplied to the injector of the exhaust gas cleaning apparatus 36 through the supply pipe, and is injected to the upstream side of the black smoke removing apparatus by this injector.

In the present embodiment, the exhaust gas cleaning apparatus 36 is disposed at the rear end portion of the left side-frame 27. The exhaust gas cleaning apparatus 36 is located above the pump. Further, the exhaust gas cleaning apparatus 36 is housed inside the machinery room disposed above the pump room. In other words, in the illustrated example, the exhaust gas cleaning apparatus 36 is disposed at the left rear end portion of the slewing frame 16. Further, the exhaust gas cleaning apparatus 36 is disposed upward spaced apart from the slewing frame 16. Therefore, the exhaust gas cleaning apparatus 36 is located spaced apart from the reducing agent tank 35, in the front-rear direction, the left-right direction, and the up-down direction respectively, and is located diagonally to the slewing frame 16 in a plan view.

The reducing agent pump 37 is disposed in an intermediate position between the reducing agent tank 35 and the exhaust gas cleaning apparatus 36. In other words, the reducing agent pump 37 is disposed at a position spaced apart from each of the reducing agent tank 35 and the exhaust gas cleaning apparatus 36. In the present embodiment, the reducing agent pump 37 is disposed at the central portion in the front-rear direction of the right side-frame 28 of the slewing frame 16. In other words, in the illustrated example, the reducing agent pump 37 is located on the same side as the reducing agent tank 35, and on the opposite side of the exhaust gas cleaning apparatus 36 in the left-right direction, and is located in an intermediate position between the reducing agent tank 35 and the exhaust gas cleaning apparatus 36 in the front-rear direction. In addition, the reducing agent pump 37 is located backward of the fuel tank 30 and forward of the cooling package 23. Namely, the reducing agent pump 37 is located between the fuel tank 30 and the cooling package 23, in the front-rear direction. Therefore, on the right side of the slewing frame 16 (the right side-frame 28), the reducing agent tank 35, the fuel tank 30, the reducing agent pump 37, the cooling package 23 are disposed in this order, from the front toward the back.

Figure 2:
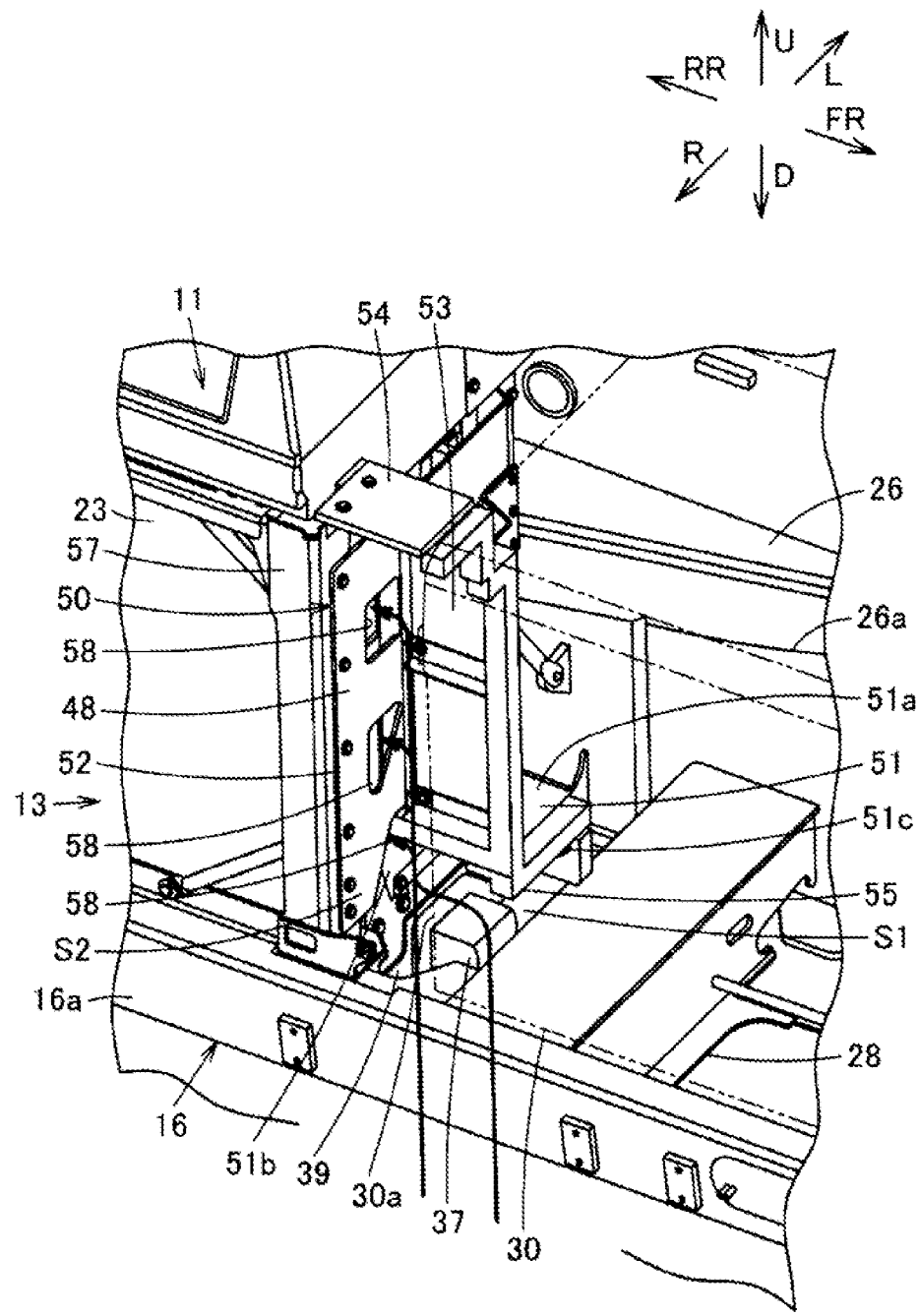
FIG. 2 is a perspective view illustrating the machine body according to the present invention.

In addition, as illustrated in FIGS. 1 and 2, the reducing agent pump 37 is disposed near the lower portion of the slewing frame 16. In the present embodiment, the reducing agent pump 37 is mounted to a mounting member 39 fixed to the slewing frame 16. The mounting member 39 is, for example, a reinforcing member of a skirt section 16a, which is an outer frame section of the slewing frame 16. The mounting member 39 is formed in a plate shape. In the illustrated example, the mounting member 39 is disposed along the main face in the up-down direction and the left-right direction, and the reducing agent pump 37 is mounted on the front face of the mounting member 39. The reducing agent pump 37 is disposed with a filter attaching/detaching portion 37a facing downward. In the illustrated example, the reducing agent pump 37 is located below the skirt section 16a.

Furthermore, the lower portion of the reducing agent pump 37 is opposed to a bottom plate 16b of the slewing frame 16. The lower portion of the reducing agent pump 37 is close to the bottom plate 16b and is separated upward from the bottom plate 16b. The bottom plate 16b is formed with an access opening section 42 that allows access to the reducing agent pump 37. The access opening section 42 is an opening section for maintenance of the reducing agent pump 37. The access opening section 42 enables access to the filter attaching/detaching portion 37a from below, and the filter can be attached/detached (replaced) from the filter attaching/detaching portion 37a via the access opening section 42. In the illustrated example, the access opening section 42 is opened in the lower portion of the reducing agent pump 37, particularly in a region including a position facing the filter attaching/detaching portion 37a.

The access opening section 42 can be opened and closed by an opening/closing member 44. The opening/closing member 44 is, for example, a bottom guard formed in a plate shape. In the present embodiment, the opening/closing member 44 is detachably fixed to the bottom plate 16b by a fixing member 45 such as a bolt. In other words, the access opening section 42 is adapted to be opened by removing the opening/closing member 44. The opening/closing member 44 is formed with a single or a plurality of opening sections 46. Namely, the opening section 46 is disposed in the bottom plate 16b of the slewing frame 16. The opening section 46 is an opening that communicates with the access opening section 42 and takes in the outside air into the slewing frame 16 (above the slewing frame 16) therethrough. The opening section 46 has a smaller opening area than that of the access opening section 42. In the present embodiment, the opening section 46 lies at least in a position facing the lower portion of the reducing agent pump 37. In the illustrated example, the opening section 46 has a main opening section 46a that lies in a position facing the lower portion of the reducing agent pump 37 and an auxiliary opening section 46b that lies in a position spaced apart from the main opening section 46a. In the present embodiment, a plurality of the main opening sections 46a are disposed side by side in the front-rear direction. A plurality of the auxiliary opening sections 46b are disposed side by side in the front-rear direction and the width direction at positions spaced apart from the lower portion of the reducing agent pump 37 outwardly in the width direction, i.e., at positions rightward spaced apart from the main opening section 46a.

Then, the outside air taken from the opening section 46 is guided to the cooling package 23 or the cooling fan 33 via the duct section 48. The duct section 48 is formed as a space portion including the reducing agent pump 37. The duct section 48 is formed by allowing the opening section 46 and the access opening section 42 to communicate with the cooling package 23 or the cooling fan 33 side. The duct section 48 may be formed in any shape, depending on a position where the reducing agent pump 37 is disposed, by using a space around the position. In the present embodiment, the duct section 48 is roughly formed so as to extend upward from the reducing agent pump 37. Further, the duct section 48 is formed adjacent to the machinery room. The duct section 48 is formed between the front portion of the cooling package 23 and the rear portion of the fuel tank 30. Further, the duct section 48 lies behind the center of slewing of the slewing frame 16.

The wall section (outer wall) of the duct section 48 is formed by one or more partitioning members 50. In the present embodiment, the front portion being a part of the wall section of the duct section 48 is formed by a rear side surface 30a being a side surface of the fuel tank 30 serving as a tank. Furthermore, in the present embodiment, the right side portion being a part of the wall section of the duct section 48, is formed by the exterior cover 25. The duct section 48 of the present embodiment partitions a flow channel having a quadrangular cross section. In the illustrated example, the inside of the duct section 48 is partitioned as a series of flow channels having the housing space S1 that houses the reducing agent pump 37 therein and directly communicates with the opening section 46 and the access opening section 42, and an air guiding space S2 that guides the outside air from the housing space S1 to the cooling package 32 or the cooling fan 33. In the present embodiment, the air guiding space S2 is disposed upward on the left side, i.e., outward in the width direction, with respect to the housing space S1. The air guiding space S2 is formed along the side surface of the machine body 11.

The partitioning member 50 may have any number and any shape such that the duct section 48 can be formed. In the present embodiment, the partitioning member 50 includes a first partitioning member 51, a second partitioning member 52, a third partitioning member 53, and a fourth partitioning member 54.

The first partitioning member 51 mainly partitions the housing space S1 within the duct section 48. In the present embodiment, the first partitioning member 51 covers the reducing agent pump 37 from above to the rearward and inward in the width direction, i.e., to the leftward. More specifically, in the present embodiment, the first partitioning member 51 includes an upper surface portion 51a facing the upper portion of the reducing agent pump 37, a rear surface portion 51b facing the rear portion of the reducing agent pump 37, and a left side surface portion 51c facing the left portion, i.e., inward in the width direction of the reducing agent pump 37.

The upper surface portion 51a forms the upper portion of the housing space S1 and inward in the width direction of the duct section 48, i.e., a part of the wall section on the left side. The upper surface portion 51a is located upward spaced apart from the upper portion of the reducing agent pump 37. The upper surface portion 51a is located parallel to or substantially parallel to the bottom plate 16b of the slewing frame 16. In the present embodiment, the upper surface portion 51a is located above the skirt section 16a of the slewing frame 16. The rear surface portion 51b forms a part of the wall section of the rear portion of the duct section 48. The rear surface portion 51b forms the rear portion of the housing space S1. The left side surface portion 51c forms a part of the wall section inward in the width direction, on the left side of the duct section 48 in the present embodiment. The left side surface portion 51c forms the left side portion of the housing space S1.

Additionally, in the present embodiment, the first partitioning member 51 is disposed extending over the second partitioning member 52 and a support member 55. The support member 55 is disposed adjacent to the rear side surface 30a of the fuel tank 30. The support member 55 is formed so that its lower end portion is fixed to the slewing frame 16 (the right side-frame 28) and stands up in the up-down direction.

The second partitioning member 52 mainly partitions the air guiding space S2, within the duct section 48. Further, the second partitioning member 52 is a plate-shaped member that partitions the duct section 48 and the machinery room. The second partitioning member 52 forms the remaining other portions of the wall section of the rear portion of the duct section 48. The second partitioning member 52 forms the rear portion of the air guiding space S2. The second partitioning member 52 is disposed so that its main surface extends along the up-down direction and in the left-right direction.

The second partitioning member 52 is attached to a stanchion 57 in the machinery room. The stanchion 57 extends linearly in the up-down direction so that its lower end portion is fixed to the slewing frame 16 (the right side-frame 28). In the present embodiment, the stanchion 57 is located at the right front end of the machinery room.

Further, in the second partitioning member 52, there is formed a communication opening 58 that communicates between the duct section 48 and the cooling package 23 or the cooling fan 33 side, i.e., the machinery room. Namely, the communication opening 58 allows the outside air to be fed from the air guiding space S2 to the cooling package 23 or the cooling fan 33. The communication opening 58 is formed so as to penetrate the second partitioning member 52. A plurality of communication openings 58 are disposed and are located spaced apart from each other in the up-down direction.

The third partitioning member 53 mainly partitions the air guiding space S2, within the duct section 48. Further, the third partitioning member 53 forms inward in the width direction of the duct section 48, i.e., the remaining other portions of the left wall section in the present embodiment. The third partitioning member 53 forms the left side portion of the air guiding space S2. The third partitioning member 53 is located inward in the width direction with respect to the exterior cover 25 (FIG. 4), and is separated to the left side in the present embodiment, and faces the exterior cover 25 (FIG. 4). The third partitioning member 53 is disposed so that its main surface extends along the front-rear direction and in the up-down direction. Namely, the second partitioning member 52 and the third partitioning member 53 are disposed so that their main surfaces intersect with each other. The third partitioning member 53 extends forward from the front portion of the second partitioning member 52. Further, the third partitioning member 53 has a longitudinal shape in the up-down direction. The third partitioning member 53 is disposed extending over the second partitioning member 52 and the support member 55.

The fourth partitioning member 54 partitions the air guiding space S2, within the duct section 48. Further, the fourth partitioning member 54 forms the upper portion of the duct section 48 and the air guiding space S2. The fourth partitioning member 54 is attached to the upper portion of the third partitioning member 53, and is disposed extending over the second partitioning member 52 and the support member 55.

At least any of the first partitioning member 51 through the fourth partitioning member 54 may be integrally formed or may be further divided into a plurality of members. Further, at least a part of the first partitioning member 51 may be integrally formed with the second partitioning member 52 or the third partitioning member 53. Similarly, at least a part of the second partitioning member 52 may be integrally formed with at least any of the first partitioning member 51 through the fourth partitioning member 54; at least a part of the third partitioning member 53 may be formed integrally with the first partitioning member 51, the second partitioning member 52, or the fourth partitioning member 54; and at least a part of the fourth partitioning member 54 may be integrally formed with the second partitioning member 52 or the third partitioning member 53. In short, the way how to form the partitioning member 50 by division or integration, and the shape of the partitioning member 50, may be set up arbitrarily depending on the size of the space in which the duct section 48 is installed and the desired shape of the duct section 48.

The rear side surface 30a of the fuel tank 30, which constitutes the front portion of the wall section of the duct section 48, is formed in a flat shape and is disposed along the up-down direction and the left-right direction. The rear side surface 30a of the fuel tank 30 spans the housing space S1 and the air guiding space S2 of the duct section 48 and forms respective front portions thereof.

Then, during the operation of the working machine 10, the hydraulic oil is pumped and discharged from the hydraulic oil tank by a pump driven by obtaining power from the engine 20, according to the operation of the operator, and the hydraulic oil is supplied and discharged to and from various actuators by the control valve, thereby enabling the working machine 10 to perform such as traveling, slewing, various works etc.

The exhaust gas of the engine 20 is cleaned by the exhaust gas cleaning system 24. More specifically, in the exhaust gas cleaning system 24, the liquid reducing agent such as urea water contained in the reducing agent tank 35 is pumped by the reducing agent pump 37 and supplied to the injector of the exhaust gas cleaning apparatus 36 through the pipes 38, and is injected to the upstream side of the black smoke removing apparatus by this injector; nitrogen oxide contained in the exhaust gas of the engine 20 is thus reduced to nitrogen.

By taking in the outside air from the ventilation port into the cooling package 23 by driving the cooling fan 33, the cooling water of the engine 20 and injector, the return oil from the actuators, or the air whose temperature is raised due to the compression of the supercharger of the engine 20 etc. is cooled respectively.

Similarly, by driving the cooling fan 33, the outside air is taken into the housing space S1 of the duct section 48 from the opening section 46, and the reducing agent pump 37 is cooled by this outside air. The outside air taken in mainly from the main opening section 46a of the opening section 46 is directly blown to the reducing agent pump 37 so that the reducing agent pump 37 is cooled, and the outside air taken in from the auxiliary opening section 46b of the opening section 46 flows into the air guiding space S2 to ensure the amount of the outside air that is taken into the duct section 48. The outside air taken in is further sucked into the cooling package 23 through the communication opening 58 from the air guiding space S2 of the duct section 48, and then passes through the cooling package 23 to cool the cooling package 23.

In this way, the outside air for cooling the reducing agent pump 37 by driving the cooling fan 33 is taken in from the opening section 46 disposed in the bottom plate 16b of the slewing frame 16, and the outside air taken in from this opening section 46 is guided to the cooling fan 33 by the duct section 48. Accordingly, the reducing agent pump 37 can be disposed in the flow channel of the cooling air from the opening section 46 to the cooling fan 33, and thereby the reducing agent pump 37 can be efficiently cooled.

For this reason, even when the reducing agent pump 37 is to be disposed spaced apart from the reducing agent tank 35 and the exhaust gas cleaning apparatus 36 as in the large-sized working machine 10, the reducing agent pump 37 can be efficiently cooled, so that deterioration of the liquid reducing agent due to overheating of the reducing agent pump 37 can be suppressed, and the quality of the liquid reducing agent can be kept. In other words, the degree of freedom in the layout of the exhaust gas cleaning system 24 including the reducing agent tank 35, the exhaust gas cleaning apparatus 36 and the reducing agent pump 37 can be increased, while maintaining the quality of the liquid reducing agent.

Further, when performing maintenance of the reducing agent pump 37, during the shutdown of the working machine 10, the opening/closing member 44 is removed from the bottom plate 16b of the slewing frame 16 and the reducing agent pump 37 is accessed from the access opening section 42 as opened. For example, the filter of the reducing agent pump 37 can be replaced at the filter attaching/detaching portion 37a. In this way, by allowing the opening section 46 to communicate with the duct section 48 via the access opening section 42 that enables access to the reducing agent pump 37, the access opening section 42 can be effectively used and both accessibility to the reducing agent pump 37 and cooling efficiency of the reducing agent pump 37 can be achieved.

Further, the outside air taken into the duct section 48 from the opening section 46 passes through the cooling package 23 to cool the cooling package 23, so that the opening section 46 can also act as a ventilation port for taking in the outside air for cooling the cooling package 23. Accordingly, the opening section 46 of the present embodiment can increase the intake amount of outside air for cooling the cooling package 23.

Further, the duct section 48 can be easily formed by utilizing the structure around the reducing agent pump 37, by assembling the partitioning member 50.

Since a part of the wall section of the duct section 48 is formed by the tank, i.e., the side surface of the fuel tank 30 in the present embodiment, separate members for forming the wall section of the duct section 48 can be reduced by effectively utilizing the side surface of the fuel tank 30, and the duct section 48 can be formed inexpensively and easily.

Then, by comprising the machine body 11 as described above, it is possible to provide a working machine 10 capable of maintaining the quality of the liquid reducing agent for a long period of time by cooling the reducing agent pump 37 and efficiently reducing the exhaust gas discharged from the engine 20 with the liquid reducing agent by the exhaust gas cleaning apparatus 36.

In the above one embodiment, the side surface of the fuel tank 30 is utilized as a part of the wall section of the duct section 48, but is not limited to this; and if a tank is adjacent to the position where the duct section 48 is formed, the side surfaces of other tanks such as a hydraulic oil tank may be utilized as a part of the wall section of the duct section 48. Similarly, in addition to utilizing the side surface of the tank as a portion of the wall section of the duct section 48, the side surface of other structure located adjacent or proximate to the duct section 48 may be utilized as a part of the wall section of the duct section 48.

Depending on the size of the access opening section 42, the access opening section 42 may be used as the opening section 46 for taking in the outside air into the duct section 48. In this way, by using the access opening section 42 as the opening section 46, it is not necessary to form a separate opening section for taking in the outside air, and both improvement of accessibility to the reducing agent pump 37 and the cooling efficiency of the reducing agent pump 37 can be kept compatible.

INDUSTRIAL APPLICABILITY

The present invention can be utilized by business operators involved in the manufacturing industry of machine bodies and working machines having a reducing agent pump for supplying a reducing agent to an exhaust gas cleaning apparatus.

The invention claimed is:

1. A machine body comprising:
   a frame having a bottom plate;
   an engine;
   an exhaust gas cleaning apparatus that executes reduction treatment on a predetermined oxide in an exhaust gas of the engine by injecting a liquid reducing agent;
   a reducing agent tank that stores a liquid reducing agent;
   a reducing agent pump that feeds the liquid reducing agent stored in the reducing agent tank to the exhaust gas cleaning apparatus;
   a cooling fan;
   an opening section disposed on the bottom plate of the frame, and takes in an outside air that cools the reducing agent pump by driving the cooling fan; and
   a duct section that leads the outside air taken from the opening section to the cooling fan, wherein the reducing agent pump is located in the flow channel of the cooling air from the opening section to the cooling fan.

2. The machine body according to claim 1, wherein the opening section is an access opening section that enables access to the reducing agent pump therethrough.

3. The machine body according to claim 1—or 2, comprising:
   a tank that stores a fluid,
   wherein a portion of a wall section of the duct section is formed by a side surface of the tank.

4. A working machine including:
   a machine body according to claim 1; and
   a working equipment mounted on the machine body.

\* \* \* \* \*